United States Patent
Wanmaker et al.

[15] 3,636,352
[45] Jan. 18, 1972

[54] STRONTIUM PYROPHOSPHATE AS ADHESIVE IN LUMINESCENT SCREENS

[72] Inventors: Willem Lambertus Wanmaker; Marinus Gerardus Antoine, both of Tak, Emmasingel, Eindhoven, Netherlands

[73] Assignee: U.S. Philips Corporation, New York, N.Y.

[22] Filed: Dec. 2, 1969

[21] Appl. No.: 881,473

[30] Foreign Application Priority Data

Dec. 4, 1968 Netherlands..........................6817327

[52] U.S. Cl..........................250/80, 117/33.5 A, 250/71 R, 252/301.4 P, 252/301.6 P, 313/109
[51] Int. Cl..........................H01j 1/62
[58] Field of Search..................250/71, 80 R; 117/33.5 AX; 252/301.4 P, 301.6 P; 313/109

[56] References Cited

UNITED STATES PATENTS

| | | | |
|---|---|---|---|
| 2,772,241 | 11/1956 | Ranby | 252/301.4 P |
| 2,826,553 | 3/1958 | Butler | 252/301.4 P |
| 3,310,418 | 3/1967 | Friedman et al. | 117/33.5 A |
| 3,484,383 | 12/1969 | Hoffman | 252/301.4 P |

*Primary Examiner*—James W. Lawrence
*Assistant Examiner*—Morton J. Frome
*Attorney*—Frank R. Trifari

[57] ABSTRACT

The invention relates to a luminescent screen including a luminescent calcium halophosphate phosphor using a strontium pyrophosphate adhesive layer provided on a transparent support. Furthermore the invention relates to a gas discharge lamp provided with such a luminescent screen.

3 Claims, 1 Drawing Figure

PATENTED JAN 18 1972
3,636,352
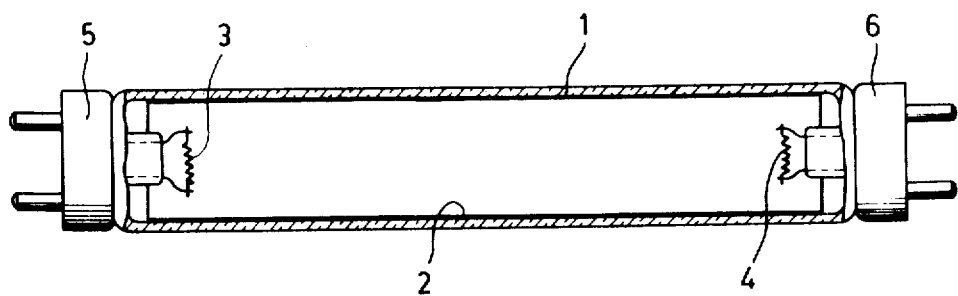
INVENTORS
WILLEM L. WANMAKER
MARINUS G. A. TAK
BY
AGENT

STRONTIUM PYROPHOSPHATE AS ADHESIVE IN LUMINESCENT SCREENS

In luminescent screens of the above-mentioned type difficulties are often experienced as a result of peeling or chipping of portions of the luminescent layer. These difficulties frequently occur particularly when the luminescent material is coarse grained and contains only a small percentage of fine particles. For providing the luminescent layer on a support a suspension is often used of the luminescent substance in a suitable suspension medium to which a generally organic binder, for example, nitrocellulose is added. This binder serves for temporary adhesion of the layer and for stabilizing and increasing the viscosity of the suspension and must later be removed, for example, by means of burning. To enhance the adhesion of the luminescent layer to the support of a finished luminescent screen, different adhesives which are permanently present in the layer have been proposed.

A number of widely divergent requirements is imposed on such a permanent adhesive. An important requirement is an optimum improvement of adhesion per quantity added, so that a small percentage of adhesive may be sufficient. When using the luminescent screen in gas discharge lamps the adhesive must have a low absorption for ultraviolet radiation. In fact, it has been found that small quantities of UV-absorbing nonluminescent material result in a great decrease of the luminous flux of a luminescent screen. Furthermore the adhesive must not absorb visible radiation because the luminous flux is of course detrimentally influenced by such absorption. Furthermore an important requirement is that the adhesive must not exert any detrimental influence on the quantum efficiency of the luminescent material, for example, due to a chemical reaction with that material, nor accelerate the decline in the luminous flux of the screen during its lifetime.

For an adhesive to be suitable for use in practice, it must satisfy a number of further conditions. Thus the addition of the adhesive must not have any detrimental effect on the structure and the appearance of the luminescent layer; the burning of an organic binder, if any, must not be impeded; the mechanical properties of the support, which generally consists of glass, must not be detrimentally influenced and it must be possible to disperse the adhesive satisfactorily in the suspension to be used.

Barium tetraphosphate ($3BaO \cdot 2P_2O_5$) is known as an adhesive in luminescent layers from the Netherlands Pat. specification No. 110,577. High percentages of this adhesive (1-10 percent by weight calculated on the weight of the luminescent material) are required so that adhesive is provided at many areas on the screen instead of luminescent material resulting in the luminous flux of the screen being reduced. The same drawback applies to calcium barium borate known from the Netherlands Pat. specification No. 121,330 and of which 3-15 percent by weight is required to obtain a sufficient improvement of adhesion.

A further known adhesive is finely divided aluminum oxide ($Al_2O_3$) which, due to the decrease of the initial luminous flux and the decline of the luminous flux during lifetime, can only be used in such small percentages (approximately 0.1 percent by weight) that the improvement of adhesion is small, particularly when using comparatively coarse-grained luminescent substances.

Furthermore, calcium pyrophosphate ($Ca_2P_2O_7$) is known as an adhesive from U.S. Pat. specification No. 3,310,418. The calcium pyrophosphate, approximately 1 percent by weight of which is required to obtain a satisfactory improvement of adhesion, satisfies the above-imposed requirements and conditions for an adhesive fairly well, but it has the drawback that it is difficult to prepare in the desired shape. Thus very fine-grained calcium pyrophosphate should be employed which can be obtained by precipitation of calcium hydrophosphate which is deposited in the form of $CaHPO_4 \cdot 2H_2O$. This precipitate must be dried under special conditions so as to prevent strong growth of grains (the so-called recrystalization). For example, a very slow drying process is required.

A luminescent screen according to the invention has a luminescent layer provided on a transparent support and is characterized in that the luminescent layer includes as an adhesive 0.05-2 percent by weight of strontium pyrophosphate, calculated on the weight of the luminescent material.

The strontium pyrophosphate, which is used in a luminescent screen according to the invention, eminently satisfies the above-imposed requirements and conditions. Notably the improvement of adhesion per quantity added is great and is even considerably greater than that of the known calcium pyrophosphate. The preparation of strontium pyrophosphate does not cause the difficulties mentioned with respect to the preparation of calcium pyrophosphate.

A percentage of between 0.1 and 0.75 percent by weight of strontium pyrophosphate is preferred, because then an improvement of adhesion which is sufficient for most uses occurs with a minimum influence on the initial luminous flux and the decline in luminous efficiency during lifetime, as will be shown hereinafter. The percentages of decline are smaller than in the case of the known calcium pyrophosphate and are not much higher than in the case of the known aluminum oxide.

The strontium pyrophosphate may advantageously be used as an adhesive in luminescent screens which comprise a halophosphate as a luminescent material. As is known the UV absorption of fine halophosphate is small so that the light output of these particles is likewise small. Consequently, when using halophosphate, for example, calcium halophosphate activated by antimony and manganese, the aim is to maintain the number of fine particles as low as possible. However, the adhesion of a coarse-grained halophosphate (mean particle size, for example, approximately $8\mu$) on the support of a screen only becomes possible in practice if an adhesive is used.

The strontium pyrophosphate in a luminescent screen according to the invention preferably has a mean grain diameter of less than $1\mu$. In fact, it has been found that the improvement of adhesion generally increases as the grain size of the adhesive decreases. The better adhesion when using strontium pyrophosphate according to the invention with respect to that when using the known calcium pyrophosphate is, however, not to be ascribed to a smaller grain size of the strontium pyrophosphate, which will be proved hereinafter.

The invention will now further be described with reference to an example of preparation of the strontium pyrophosphate and two examples of preparation of suspensions which comprise a luminescent material and an adhesive according to the invention. The results of tests with gas discharge lamps provided with luminescent screens according to the invention and manufactured with the aid of the suspensions according to the above-mentioned examples will also be described.

EXAMPLE OF PREPARING STRONTIUM PYROPHOSPHATE

Three liters of a 3-molar strontium chloride solution were added, while rapidly stirring, to 18 liters of a 0.5-molar ammonium hydrophosphate solution. A deposit of strontium hydrophosphate ($SrHPO_4$) was then formed which was filtered off, washed and subsequently dried at a temperature of approximately 120° C. for approximately 16 hours. The dried $SrHPO_4$ thus obtained was heated for approximately 30 minutes at a temperature of approximately 500° C. and thereby converted to strontium pyrophosphate.

To obtain a measure of the grain size of this strontium pyrophosphate the specific surface of the powder was measured. This was found to be 16.8 sq. m./g. Upon measuring the mean diameter of the powder particles this was found to be smaller than $1\mu$.

EXAMPLES OF PREPARING SUSPENSIONS AND TESTS ON LUMINESCENT SCREENS AND LAMPS MANUFACTURED WITH THE AID OF SAID SUSPENSIONS

I. Fifty grams of strontium pyrophosphate obtained by the method described above were intensively mixed together with 200 ml. of monomethylglycolether for approximately 24 hours in a ball mill. No real grinding operation took place during this treatment, but strontium pyrophosphate aggregates were broken off and the separate crystals were suspended in the monomethylglycolether. 22.5 ml. of this suspension were added while rapidly stirring to 450 ml. of butylacetate in which 6.5 g. of nitrocellulose per liter was dissolved. Five hundred grams of calcium halophosphate activated by antimony and manganese were added to the suspension obtained in this manner under continued rapid stirring. After a few minutes of stirring this suspension was ready for use. The halophosphate used had a main grain size of approximately $8\mu$.

Low-pressure mercury vapor discharge lamps were manufactured with the aid of the suspension thus obtained. To this end the inner sides of cylindrical glass tubes were coated with a thin uniform layer of the suspension. Subsequently the tubes were dried and sintered at a temperature of approximately 590° C. Prior to the tubes being processed to lamps in known manner the adhesion of the sintered luminescent layer was measured. To this end a fine jet of water was directed onto the sintered luminescent layer. The pressure of the jet of water was slowly increased and read at the instant when a small hole in the luminescent layer became clearly visible. The measured values of the pressure (in mm. Hg) form the adhesion figures which are a measure of the adhesion of the luminescent layer. The initial luminous flux (0 h.) and the luminous flux after 100 operating hours (100 h.) of the lamps was measured. The (average) results of the measurements are summarized in the table below under the heading C. The headings A and B state the results of measurements of lamps which are manufactured in the same manner by means of a suspension in which, however, the known aluminum oxide was used as an adhesive in case A and the known calcium pyrophosphate was used for case B instead of strontium pyrophosphate.

TABLE

| Lamps | Adhesive used | Adhesion figure | Luminous flux in lumens/w. 0 h. | Luminous flux in lumens/w. 100 h. | Specific surface adhesive in sq. m./g. |
|---|---|---|---|---|---|
| A | 0.1% by weight of $Al_2O_3$ | 120 | 79.0 | 76.9 | [1] 158 |
| B | 1% by weight of $Ca_2P_2O_7$ | 150 | 78.7 | 76.4 | 17.0 |
| C | 1.0% by weight of $Sr_2P_2O_7$ | 274 | 78.5 | 76.2 | 16.2 |

[1] Approximately.

An adhesion figure of 150 as was reached with 1 percent by weight of the known calcium pyrophosphate is amply sufficient in most cases. It is found from the table that when using 1 percent by weight of strontium pyrophosphate according to the invention it is possible to reach adhesion figures which are almost a factor of 2 greater. In most cases smaller percentages of strontium pyrophosphate will therefore suffice, as will be shown in the following example.

The table also states the specific surfaces in sq. m./g. of the adhesives used. These values are inversely proportional to the grain size. The pyrophosphates used have substantially the same grain sizes from which it is evident that the greater improvement of adhesion of the strontium pyrophosphate is not due to a finer grain.

II. Forty g. of strontium pyrophosphate prepared in the manner as described above and having a specific surface of 17.5 sq. m./g. were mixed with 240 ml. of butyl acetate containing 1 percent by weight of nitrocellulose for 24 hours in a ball mill. Subsequently the suspension was diluted by 160 ml. of the same solution of nitrocellulose in butyl acetate. Forty-two milliliters of this suspension were added while quickly stirring to a suspension of 400 g. of halophosphate in 350 ml. of butyl acetate which contains 1 percent by weight of nitrocellulose.

Luminescent screens including 1 percent by weight of strontium pyrophosphate (calculated on the luminescent material) were manufactured by means of the suspension thus obtained. Furthermore luminescent screens were manufactured in an analogous manner without an adhesive, with 1 percent by weight of calcium pyrophosphate, with one-half percent by weight of strontium pyrophosphate and with one-fourth percent by weight of strontium pyrophosphate, respectively. Tests of the adhesion had the following results:

without adhesive 71

| | |
|---|---|
| 1 percent by weight of $Ca_2P_2O_7$ | 146 |
| 1 percent by weight of $Sr_2P_2O_7$ | 289 |
| ½ percent by weight of $Sr_2P_2O_7$ | 191 |
| ¼ percent by weight of $Sr_2P_2O_7$ | 128 |

It is clearly evident that for obtaining a great improvement of adhesion it may be sufficient to have a much smaller quantity of $Sr_2P_2O_7$ according to the invention than the conventional quantity of 1 percent by weight for the known $Ca_2P_2O_7$.

III. Suspensions of calcium halophosphate activated by antimony and manganese were manufactured in accordance with the method of preparation described in example I. The suspensions contain 0.1 percent by weight of $Al_2O_3$, 1 percent by weight of $Ca_2P_2O_7$, 0.5 percent by weight of $Sr_2P_2O_7$ and 0.25 percent by weight of $Sr_2P_2O_7$, respectively, as adhesives. The butyl acetate used contains, however, 10.2 g. of nitrocellulose per liter. Low-pressure mercury vapor discharge lamps were manufactured with the aid of these suspensions. Tests of the adhesion figure, the initial luminous flux and the luminous flux after 100 operating hours gave the following results:

| Lamps | Adhesive used | Adhesion figure | Luminous flux in lumens/w. 0 hr. | Luminous flux in lumens/w. 100 hr. |
|---|---|---|---|---|
| A | 0.1% by weight of $Al_2O_3$ | 113 | 79.0 | 75.7 |
| B | 1.0% by weight of $Ca_2P_2O_7$ | 181 | 78.1 | 76.0 |
| C | 0.5% by weight of $Sr_2P_2O_7$ | 280 | 79.4 | 77.4 |
| D | 0.25% by weight of $Sr_2P_2O_7$ | 187 | 79.3 | 77.4 |

It is found from the tests that a great improvement of adhesion combined with a negligible influence on the initial luminous flux on the luminous flux during the lifetime can be achieved when using small percentages of strontium pyrophosphate according to the invention.

The lamps referred to in example III were manufactured in a manner known per se. This manufacture includes a.o. a step during which a cylindrical lamp envelope of glass is covered with a fluorescent layer including the strontium pyrophosphate as an adhesive, by filling the envelope with the suspension as described in example III, removing excess suspension which has not adhered to the envelope, drying the adhering suspension layer and sintering the dry layer in an oven. A lamp having an envelope so prepared is shown in the drawing. The lamp as shown has a glass envelope 1 provided with an interior fluorescent layer 2 which includes the adhesive strontium pyrophosphate. The lamp further has an electrode 3 and 4 at either end and lamp bases 5 and 6.

What is claimed is:

1. A luminescent screen on a transparent support, said screen comprising calcium halophosphate phosphor particles mixed with finely divided particles of strontium pyrophosphate as an adhesive in an amount of 0.05 to 2 percent by weight of the phosphor particles wherein the mean particle size of the strontium pyrophosphate is smaller than 1 micron.

2. The luminescent screen of claim 1 wherein 0.1–0.75 percent by weight of the strontium pyrophosphate is employed.

3. A gas discharge lamp provided with a luminescent screen on a transparent support, said screen comprising calcium halophosphate phosphor particles mixed with finely divided particles of strontium pyrophosphate as an adhesive in an amount of 0.1–0.75 percent by weight of the phosphor particles, wherein the mean particle size of the strontium pyrophosphate is smaller than 1 micron.

* * * * *

PO-1050
(5/69)

UNITED STATES PATENT OFFICE
CERTIFICATE OF CORRECTION

Patent No. 3,636,352 (PHN 3694)   Dated   January 18, 1972

Inventor(s) WILLEM LAMBERTUS WANMAKER ET AL

It is certified that error appears in the above-identified patent and that said Letters Patent are hereby corrected as shown below:

In the title page, the second line of item [72] should read -- Gerardus Antoine Tak, both of Emmasin- --.

Signed and sealed this      day of 1972.

Signed and sealed this 24th day of April 1973.

(SEAL)
Attest:

EDWARD M. FLETCHER, JR.          ROBERT GOTTSCHALK
Attesting Officer                Commissioner of Patents